United States Patent [19]

Miyoshi

[11] Patent Number: 4,719,981
[45] Date of Patent: Jan. 19, 1988

[54] FOUR-WHEEL STEERING SYSTEM
[75] Inventor: Akihiko Miyoshi, Hiroshima, Japan
[73] Assignee: Mazda Motor Corporation, Japan
[21] Appl. No.: 775,330
[22] Filed: Sep. 12, 1985
[30] Foreign Application Priority Data Sep. 17, 1984 [JP] Japan .................. 59-195411

[51] Int. Cl.$^4$ .................................................. B62D 5/06
[52] U.S. Cl. .................................. 180/140; 180/142; 280/91
[58] Field of Search ............. 180/140, 141, 142, 143, 180/79, 132; 280/91

[56] References Cited

U.S. PATENT DOCUMENTS

| | | | |
|---|---|---|---|
| 4,418,780 | 12/1983 | Ito | 180/142 |
| 4,441,572 | 4/1984 | Ito | 180/140 |
| 4,552,239 | 11/1985 | Kanazawa | 180/141 |
| 4,566,709 | 1/1986 | Sano | 280/91 |
| 4,566,710 | 1/1986 | Furukawa | 180/140 |
| 4,572,316 | 2/1986 | Kanazawa | 180/143 |

FOREIGN PATENT DOCUMENTS 55-91457  7/1980  Japan .................................. 280/91

Primary Examiner—David M. Mitchell
Assistant Examiner—Charles R. Watts

Attorney, Agent, or Firm—Gerald J. Ferguson, Jr.; Michael P. Hoffman; Michael J. Foycik, Jr.

[57] ABSTRACT

A four-wheel steering system for a vehicle comprises a steering wheel, a front wheel turning mechanism for turning front wheels in response to operation of the steering wheel, and a rear wheel turning mechanism which turns rear wheels in response to operation of the steering wheel and is provided with an electric actuator for changing the position of a movable member the position of which determines a rear wheel turning angle ratio which is the ratio of the turning angle of the rear wheels to the turning angle of the front wheels for a given turning angle of the steering wheel. A control circuit receives a vehicle speed signal from a vehicle speed sensor and controls the electric actuator according to the detected vehicle speed so that a target rear wheel turning angle ratio determined in advance according to the vehicle speed is obtained. A preset vehicle speed detector detects a preset vehicle speed and a rear wheel turning angle ratio detector detects the actual rear wheel turning angle ratio. A correction circuit which receives signals from the preset vehicle speed detector and the rear wheel turning angle ratio detector and controls the electric actuator to change the position of the movable member so that the actual rear wheel turning angle ratio coincides with the target rear wheel turning angle ratio at said preset vehicle speed.

9 Claims, 8 Drawing Figures

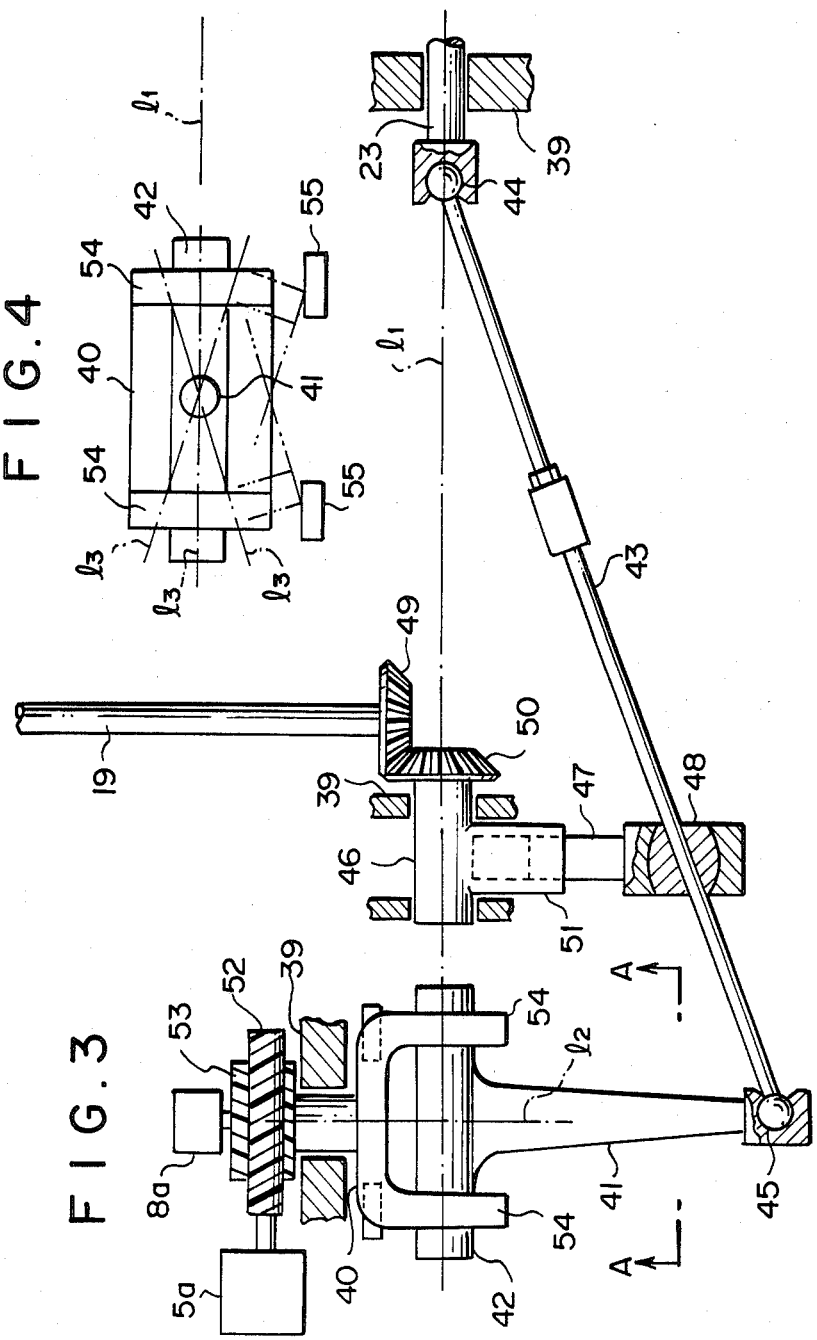

FOUR-WHEEL STEERING SYSTEM

BACKGROUND OF THE INVENTION

1. Field of the Invention

This invention relates to a four-wheel steering system for a vehicle in which both the front wheels and the rear wheels are turned in response to operation of the steering wheel.

2. Description of the Prior Art

In Japanese Unexamined Patent Publication 59(1984)-81272, there is disclosed a four-wheel steering system in which a pinion of a steering shaft for turning the front wheels is engaged with a ring gear of a differential gear, one of the side gears of the differential gear is connected to an electric motor and the other side gear is connected to a shaft for turning the rear wheels and in which the rear wheel turning characteristics, that is, which direction the rear wheels are turned in for a given turning direction of the front wheels, in the same direction (the same phase) or reverse direction (the reverse phase) and the rear wheel turning angle ratio (the ratio of the turning angle of the rear wheels to the turning angle of the front wheels), are changed by controlling the electric motor. Further, in U.S. Pat. No. 4,418,780, there is disclosed a four-wheel steering system in which the rear wheel turning angle ratio is changed according to the vehicle speed.

In the case that the rear wheel turning angle ratio is changed by controlling an electric motor, the actual rear wheel turning angle ratio can be deviated from a desired rear wheel turning angle ratio when the electric motor itself or the control system thereof temporarily malfunctions due to disturbance. This can be avoided by comparing the actual rear wheel turning angle ratio with the desired rear wheel turning angle ratio and correcting the actual rear wheel turning angle ratio based on the result of the comparison. However, when the rear wheel turning angle ratio is always feedback-controlled on the basis of the output of a rear wheel turning angle ratio sensor, it is difficult to obtain quick response due to the time required for signal processing and hunting is apt to occur, that is, the actual rear wheel turning angle ratio is apt to fluctuate about the desired rear wheel turning angle ratio.

SUMMARY OF THE INVENTION

In view of the foregoing observations and description, the primary object of the present invention is to provide a four-wheel steering system in which the actual rear wheel turning angle ratio can be quickly converged on a desired rear wheel turning angle ratio.

The four-wheel steering system in accordance with the present invention comprises a steering wheel, a front wheel turning mechanism for turning front wheels in response to operation of the steering wheel and a rear wheel turning mechanism which turns rear wheels in response to operation of the steering wheel and is provided with an electric actuator for changing the position of a movable member the position of which determines the rear wheel turning angle ratio. A control means receives a vehicle speed signal from a vehicle speed sensor and controls the electric actuator according to the detected vehicle speed so that a target rear wheel turning angle ratio determined in advance according to the vehicle speed is obtained. The four-wheel steering system of the present invention further comprises a preset vehicle speed detecting means for detecting a preset vehicle speed, a rear wheel turning angle ratio detecting means for detecting the actual rear wheel turning angle ratio, and a correction means which receives signals from the preset vehicle speed detecting means and the rear wheel turning angle ratio detecting means and controls the electric actuator to change the position of the movable member so that the actual rear wheel turning angle ratio coincides with the target rear wheel turning angle ratio at said preset vehicle speed.

BRIEF DESCRIPTION OF THE DRAWINGS

FIG. 3 is an enlarged fragmentary view partly in cross section showing in detail the rear wheel turning angle ratio changing mechanism employed in the four-wheel system of FIG. 2, FIG. 4 is a cross-sectional view taken along line A—A in FIG. 3.

DESCRIPTION OF THE PREFERRED EMBODIMENTS

Figure 1:
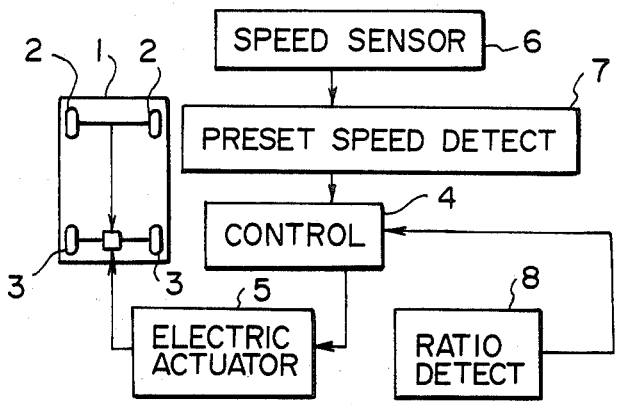
FIG. 1 is a view showing the general arrangement of the four-wheel steering system in accordance with the present invention.

As shown in FIG. 1 which shows the general arrangement of the present invention, in the four-wheel steering system in accordance with the present invention, rear wheels 3 of a vehicle 1 are turned in response to turning of front wheels 2 and the ratio of the turning angle of the rear wheels 3 to the turning angle of the front wheels 2 (the rear wheel turning angle ratio) is changed by an electric actuator 5 under the control of a control signal generated from a controller 4 according to the vehicle speed. When a preset vehicle speed is detected by a preset vehicle speed detector 7 through the output of a vehicle speed sensor 6, the controller 4 delivers a correction signal to the electric actuator 5 so that the actual rear wheel turning angle ratio detected by a rear wheel turning angle ratio sensor 8 converges on the desired rear wheel turning angle ratio at the preset vehicle speed.

Now, a concrete embodiment of the present invention will be described in detail with reference to FIGS. 2 to 7.

Figure 2:
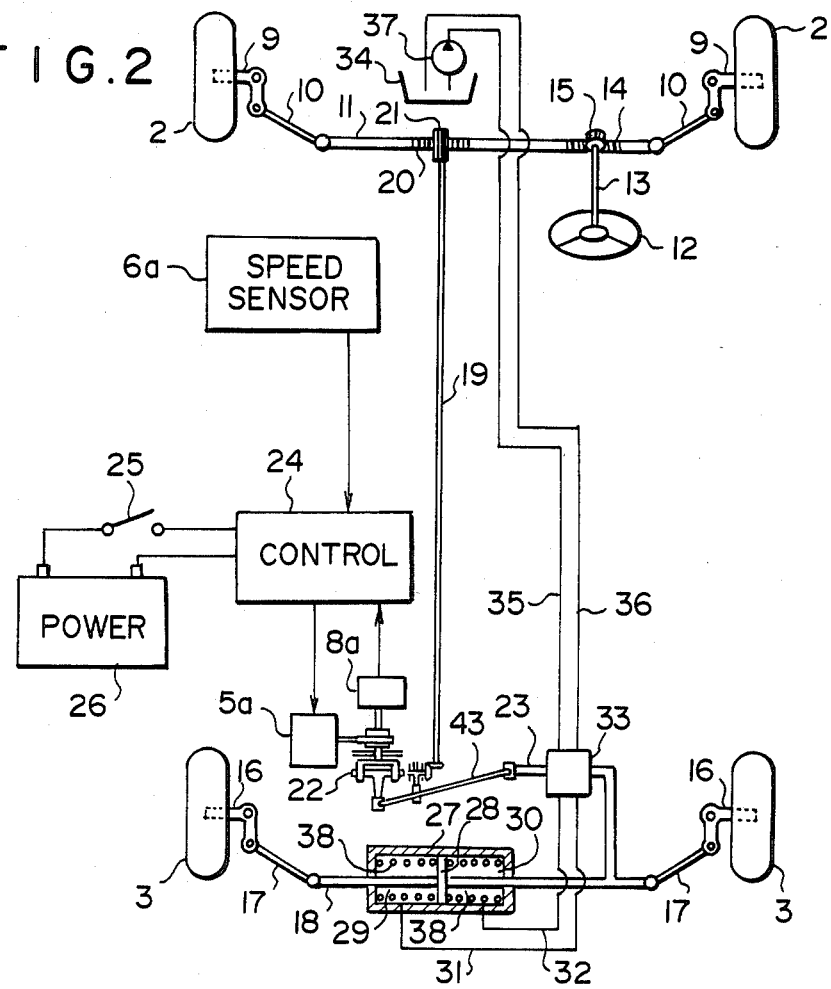
FIG. 2 is a schematic view showing a four-wheel steering system in accordance with an embodiment of the present invention.

In FIG. 2, right and left front wheels 2 are connected to the respective ends of a relay rod 11 by way of knuckle arms 9 and tie rods 10. The relay rod 11 is provided with a rack 14 which is in mesh with a pinion 15 on a steering shaft 13 connected to a steering wheel 12. The relay rod 11 is moved right or left in response to operation of the steering wheel 12 to turn the front wheels 2.

Right and left rear wheels 3 are connected to the respective ends of a relay rod 18 by way of knuckle arms 16 and tie rods 17 to be turned in response to a transverse movement of the relay rod 18. The relay rod 18 is transversely moved in response to a transverse movement of the relay rod 11 under assistance of a hydraulic system.

That is, the front relay rod 11 is provided with another rack 20 in mesh with a pinion 21 on the front end of a connecting rod 19 which extends in the longitudinal direction of the vehicle body. The rear end of the connecting rod 19 is operatively connected, by way of a rear wheel turning angle ratio changing mechanism 22 for changing the ratio of the rear wheel turning angle to the front wheel turning angle, to a control rod 23 extending from the rear relay rod 18. When the front relay rod 11 is moved, the connecting rod 19 is rotated to move the control rod 23 right or left by an amount corresponding to the rear wheel turning angle ratio determined by the rear wheel turning angle ratio changing mechanism 22, thereby turning the rear wheels 3 by an angle corresponding to the rear wheel turning angle ratio.

The rear wheel turning angle ratio is changed by controlling a step motor 5a corresponding to the electric actuator 5 in FIG. 1. The step motor 5a is controlled by a control circuit 24 which outputs a control signal according to the outputs of a vehicle speed sensor 6a. The rear wheel turning angle ratio changing mechanism 22 is provided with a rear wheel turning angle ratio detecting means 8a which delivers a rear wheel turning angle ratio signal to the control circuit 24. The control circuit 24 is connected to a power source 26 by way of an ignition switch 25.

The rear relay rod 18 extends through a power cylinder 27 fixed to the vehicle body. A pair of hydraulic pressure chambers 29 and 30 are defined in the power cylinder 27 by a piston 28 fixed to the rear relay rod 18. The hydraulic pressure chambers 29 and 30 are connected to a control valve 33 by way of oil pipes 31 and 32 respectively. An oil feed pipe 35 and an oil return pipe 36 are connected between the control valve 33 and an oil reservoir 34. The control valve 33 detects the direction of movement of the control rod 23 and communicates the oil feed pipe 35 with one of the hydraulic pressure chambers 29 and 30, and the oil return pipe 36 with the other according to the direction of movement of the control rod 23. At the same time, the control valve 33 controls the oil pressure provided by an oil pump 37 disposed in the oil feed pipe 35 to a value corresponding to the force of movement of the control rod 23. The oil pressure thus introduced into one of the hydraulic pressure chambers 29 and 30 multiplies the relay rod moving force or the rear wheel turning force.

The oil pump 37 is driven by the engine, and the power cylinder 27 is provided with springs 38 for urging the rear relay rod 18 to the neutral position, i.e., the position in which the rear wheels 3 are turned neither right nor left.

The rear wheel turning angle ratio changing mechanism 22 is shown in detail in FIG. 3. Said control rod 23 is supported for sliding movement in the transverse direction of the vehicle body 39 along line $1_1$. The rear wheel turning angle ratio changing mechanism 22 includes a holder 40 supported by the vehicle body 39 for pivotal motion about line $1_2$ perpendicular to the line $1_1$. A pivoted arm 41 is mounted on the holder 40 by a pivot shaft 42. The pivot shaft 42 intersects the line $1_2$ at the intersection of the lines $1_1$ and $1_2$ and the central axis $1_3$ of the pivot shaft 42 extends in perpendicular to the line $1_2$.

A connecting rod 43 is connected to the control rod 23 by way of a ball joint 44 at one end and to the free end of the pivoted arm 41 by way of a ball joint 45 at the other end. A swinging arm 47 for swinging the connecting rod 43 is supported on the vehicle body 39 for pivotal motion about a shaft 46 extending along the line $1_1$ and is connected to the connecting rod 43 by way of a ball joint 48 at the free end thereof. The shaft 46 of the swinging arm 47 is provided with a bevel gear 50 at one end, and the bevel gear 50 is in mesh with a bevel gear 49 on the rear end of the connecting rod 19 which extends rearward from the front relay rod 11. The swinging arm 47 is slidably inserted into a cylinder 51 formed integrally with the shaft 46, whereby movement of the swinging arm 47 in a direction perpendicular to the shaft 46 is permitted. A worm 52 is provided on the output shaft of the step motor 5a and is in mesh with a worm wheel 53 provided on a rotational shaft of the holder 40. The rear wheel turning angle ratio is changed by rotating the holder 40 by the step motor 5a in the following manner, and the rear wheel turning angle ratio detecting means 8a detects the rear wheel turning angle ratio through the angular position of the holder 40.

Front wheel turning motion or sliding movement of the front relay rod 11 is transmitted to the pivoted arm 41 by way of the connecting rod 19, the swinging arm 47 and the connecting rod 43, thereby swinging the pivoted arm 41 about the axis $1_3$. When the axis $1_3$ is aligned with the line $1_1$ along which the control rod 23 is movable, the free end of the pivoted arm 41 is moved in a plane perpendicular to the line $1_1$, and accordingly, the swinging movement of the pivoted arm 41 exerts no force on the control rod 23. That is, the rear wheels 3 are not turned or, in other words, the rear wheel turning angle ratio is zero in this case.

On the other hand, when the step motor 5a is actuated and the axis $1_3$ is inclined with respect to the line $1_1$ as shown in FIG. 4, the free end of the pivoted arm 41 is swung in a plane inclined with respect to the line $1_1$ and a force pulling or pushing the control rod 23 is exerted on the control rod 23 by way of the connecting rod 43 upon operation of the steering wheel 12. When axis $1_3$ is inclined clockwisely as seen in FIG. 4, the rear relay rod 18 is moved in the same direction as the front relay rod 11 and accordingly the rear wheels 3 and the front wheels 2 are turned in the same direction. (same phase) In this case, the rear wheel turning angle ratio is defined to be positive. When the axis $1_3$ is inclined with respect to the line $1_1$ counterclockwisely as seen in FIG. 4, the rear wheels 3 and the front wheels 2 are turned in opposite directions. (reverse phase) In this case, the rear wheel turning angle ratio is defined to be negative.

The pivot shaft 42 is supported by a pair of arms 54 of the holder 40 at both ends thereof. The arms 54 are formed integrally with each other. The rotation of the holder 40 is limited by stoppers 55 which are provided on the vehicle body 39 and are adapted to abut against a base portion of the arms 54.

Figure 5:
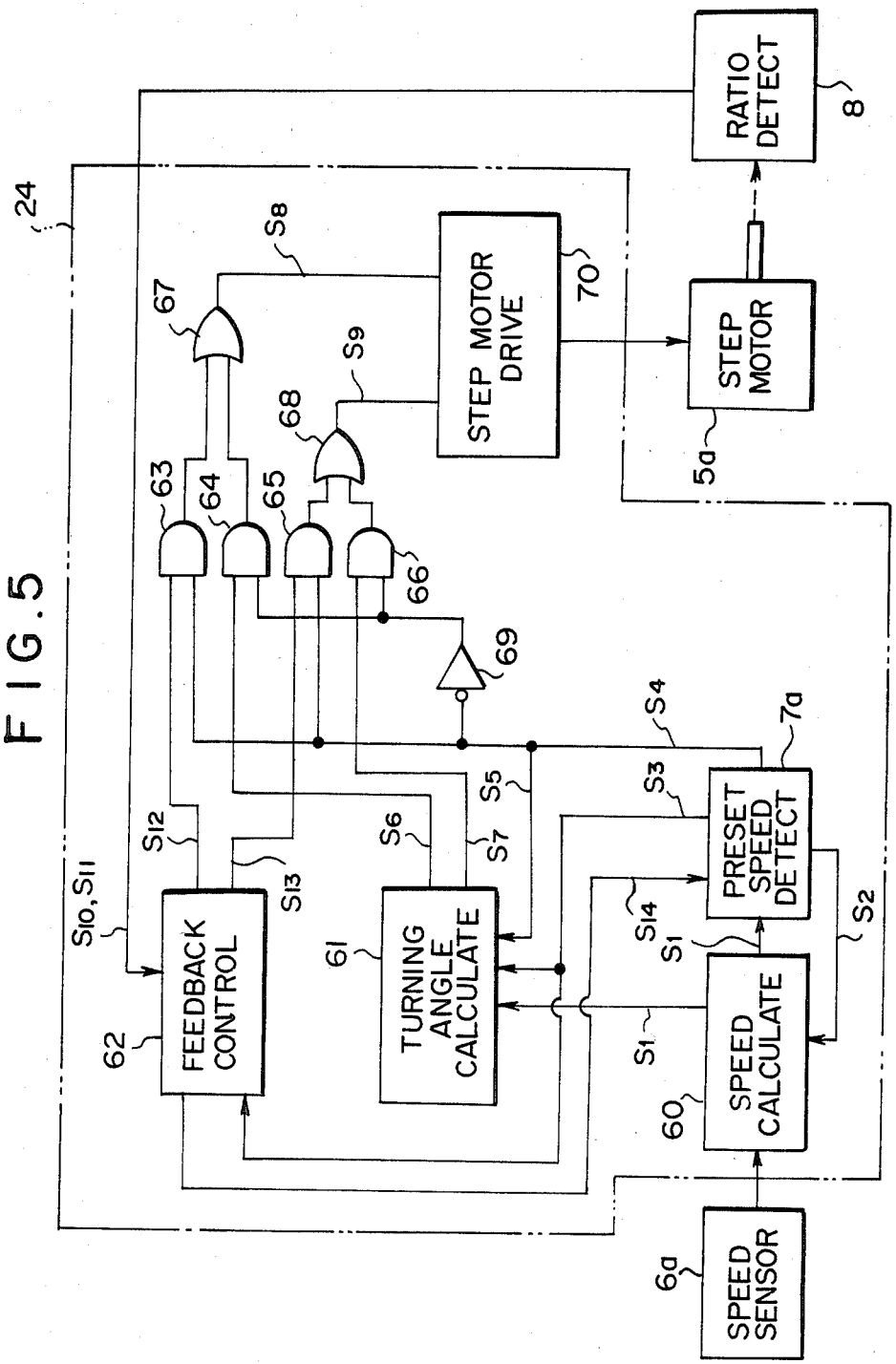
FIG. 5 is a block diagram of the control circuit employed in the four-wheel system of FIG. 2.
Figure 6:
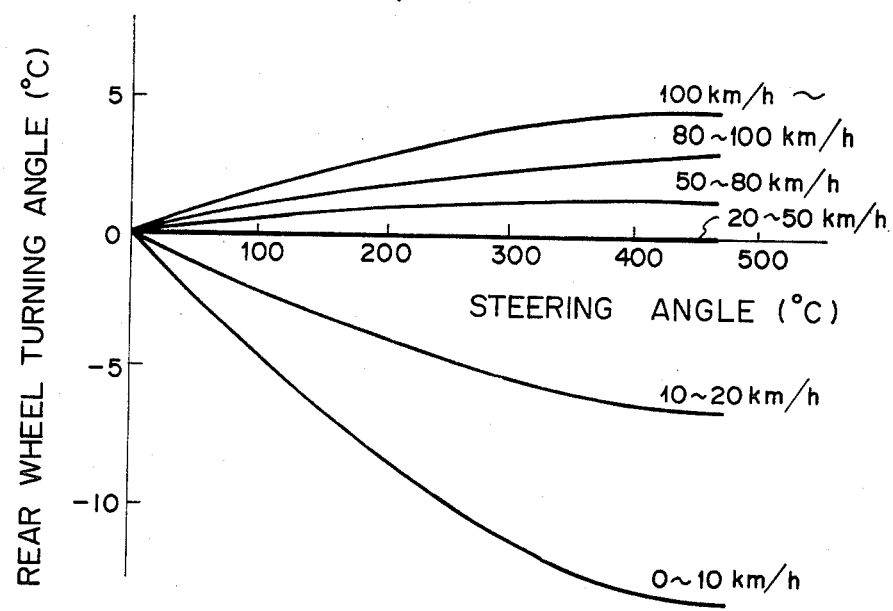
FIG. 6 is a view showing the rear wheel turning angle ratio characteristics employed in the four-wheel steering system of FIG. 2.
Figure 7:
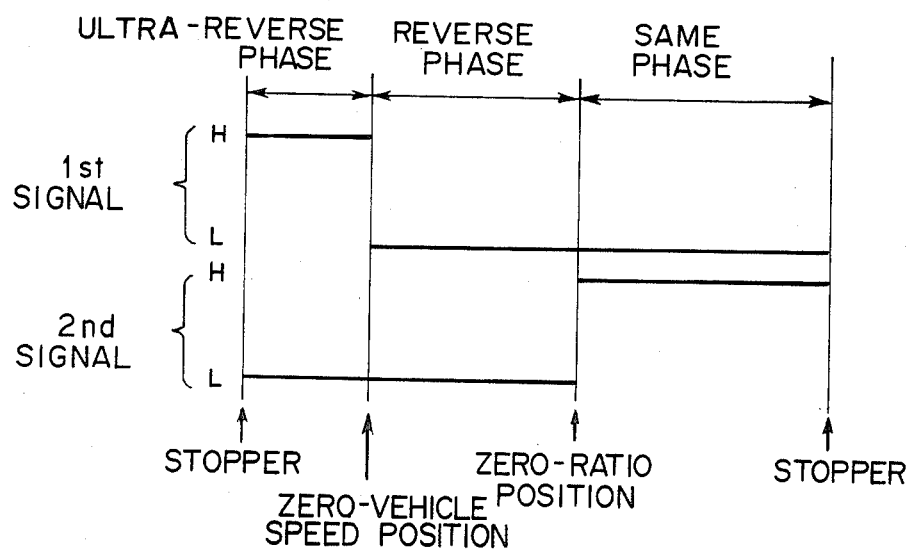
FIG. 7 is a schematic view for illustrating the operation of the rear wheel turning angle ratio detecting means employed in the four-wheel steering system of FIG. 2.

Now, the control circuit 24 will be described in detail with reference to FIG. 5. The control circuit 24 includes a vehicle speed calculating section 60, a turning angle calculating section 61 which selects one of the rear wheel turning angle ratio characteristic curves shown in FIG. 6 according to the vehicle speed, and a feedback control section 62 which receives a signal from a preset vehicle speed detector 7a and corrects the rear wheel turning angle ratio.

The vehicle speed calculating section 60 converts a pulse signal from the vehicle speed sensor 6a into a voltage and delivers a vehicle speed signal S1 to the turning angle calculating section 61 and the preset vehicle speed detector 7a. In this particular embodiment, the preset vehicle speed detector 7a detects zero vehicle speed and a vehicle speed at which the rear wheel turning angle ratio is zero, and when one of them is detected, the preset vehicle speed detector 7a delivers holding signal S2 to the vehicle speed calculating section 60, and a preset vehicle signal S3 to both the turning angle calculating section 61 and the feedback control section 62. The preset vehicle speed detector 7a outputs an H (high) signal when zero vehicle speed is detected while outputs an L signal when a vehicle speed at which the rear wheel turning angle ratio is zero as the preset vehicle speed signal S3. Further, the preset vehicle speed detector 7a delivers to the logic circuit a detecting signal S4 which is an H signal when one of the preset vehicle speeds is detected and is an L signal when neither of the preset vehicle speeds is detected. The detecting signal S4 is delivered to the turning angle calculating section 61 as an initializing signal S5 when it is an H signal.

The control circuit 24 includes as the logic circuit first to fourth AND circuits 63 to 66, a first OR circuit 67 into which outputs of the first and second AND circuits 63 and 64 are input, and a second OR circuit 68 into which outputs of the third and fourth AND circuits 65 and 66 are input. The preset vehicle speed detector 7a delivers its output to the first and third AND circuits 63 and 65 as it is. On the other hand, the preset vehicle speed detector 7a delivers its output to the second and fourth AND circuits 64 and 66 after inverting it by an inverter 69.

When the vehicle speed is not equal to the preset speeds, the turning angle calculating section 61 delivers a rotational direction determining signal S6 to the second AND circuit 64 and a motor driving pulse signal S7 to the fourth AND circuit 66. The rotational direction determining signal S6 is for determining the direction in which the step motor 5a is to be rotated and is generated on the basis of a selected rear wheel turning angle ratio characteristic curve. The motor driving pulse signal S7 is for controlling the angle by which the step motor 5a is to be rotated and is generated on the basis of the absolute value of the desired rear wheel turning angle ratio. For example, the rotational direction determining signal S6 may be an H signal when the rear wheel turning angle ratio is to be increased and may be an L signal when the rear wheel turning angle ratio is to be reduced.

When the detecting signal S4 of the preset vehicle speed detector 7a is L, the outputs of the first and third AND circuits 63 and 65 are both L and, accordingly, the outputs of the first and second OR circuits 67 and 68 respectively correspond to the outputs of the second and fourth AND circuits 64 and 66. In this case, the signals input into the second and fourth AND circuits 64 and 66 from the preset vehicle speed detector 7a are H, and accordingly the outputs of the second and fourth AND circuits 64 and 66 correspond to the output of the turning angle calculating section 61. Thus, a rotational direction signal S8 and a driving pulse signal S9 corresponding to the output of the turning angle calculating section 61 are delivered to a step motor driving section 70. The step motor 7a rotates the holder 40 by an angle to obtain the rear wheel turning angle ratio calculated by the turning angle calculating section 61 under the control of a signal output from the step motor driving section 70.

The feedback control circuit 62 corrects the rear wheel turning angle ratio taking into account the signal from the rear wheel turning angle ratio detecting means 8a when the preset vehicle speed signal S3 is input thereinto from the preset vehicle speed detector 7a. The rear wheel turning angle ratio detecting means 8a outputs first and second signals S10 and S11 with respect to the position of the holder 40, the first signal S10 being related to the position of the holder 40 corresponding to the rear wheel turning angle ratio for zero vehicle speed (this position will be referred to as "zero-vehicle-speed position", hereinbelow) and the second signal S11 being related to the position of the holder 40 at which the rear wheel turning angle ratio is zero (this position will be referred to as "zero-ratio position", hereinbelow). The first signal S10 is L when the holder 40 is on the positive side of the zero-vehicle-speed position and is H when it is on the negative side of the same. The second signal S11 is H when the holder 40 is on the positive side of the zero-ratio position and L when it is on the negative side of the same. The feedback control section 62 judges that the holder 40 is in the reverse phase range when the first and second signals S10 and S11 are both L and that the holder 40 is in the same phase range when the first signal S10 is L and the second signal S11 is H. When the first and second signals S10 and S11 are both L, the feedback control section 62 judges that the holder 40 is in "the ultra-reverse phase range" in which the absolute value of the rear wheel turning angle ratio exceeds the absolute value of the designed minimum rear wheel turning angle ratio.

When the position of the holder 40 is corrected when the holder 40 is to be in the zero-ratio position (this correction is made when the vehicle speed at which the rear wheel turning angle ratio is to be zero is detected), the feedback control section 62 first judges from the first and second signals S10 and S11 in which direction the holder 40 is displaced from the zero-ratio position, i.e., which the actual rear wheel turning angle ratio is in, the same phase range or the reverse phase range. When the first and second signals S10 and S11 are both L and the feedback control section judges that the actual rear wheel turning angle ratio is smaller than zero and in the reverse phase range, the feedback control section 62 delivers an H signal as a rotational direction directing signal S12 to the first AND circuit 63 and driving pulse signals S13 to the third AND circuit 65 one by one. Since L signals (obtained by inverting H signals from the preset vehicle speed detector 7a) are input into the second and fourth AND circuits 64 and 66 at this time, the outputs of the first and second OR circuits 67 and 68 correspond to the outputs S12 and S13 of the feedback control section 62 delivered thereto by way of the first and third AND circuits 63 and 65. Thus, the step motor driving section 70 receives the rotational direction signal S8 which is H in this case and driving pulse signals S9 and drives the step motor 5a step by step in the direction in which the rear wheel turning angle ratio is increased until the second signal S11 turns to H. The feedback control circuit 62 judges that the actual position of the holder 40 coincides with the zero-ratio position, i.e., that the actual rear wheel turning angle ratio coincides with the rear wheel turning angle ratio which has been calculated by the turning angle calculating section 61 and fixed by the initializing signal S5, when the second signal S11 turns to H and stops the feedback control. At the same time, the feedback control section 62 outputs a feedback control termination signal S14 to the preset vehicle speed detector 7a, and the preset vehicle speed detector 7a outputs a release signal to the vehicle speed calculating section 60 and the turning angle calculating section 60, whereby open loop control by the turning angle calculating section 60 is started again.

On the other hand, when the first signal S10 is L and the second signal S11 is H, and the feedback control section judges that the actual rear wheel turning angle ratio is larger than zero and in the same phase range, the feedback control section 62 delivers an L signal as the rotational direction directing signal S12 to the first AND circuit 63 and driving pulse signals S13 to the third AND circuit 65 one by one. Thus, the step motor driving section 70 receives the rotational direction signal S8 which is L in this case and driving pulse signals S9 and drives the step motor 5a step by step in the direction in which the rear wheel turning angle ratio is reduced until the second signal S11 turns to L. The feedback control circuit 62 judges that the actual position of the holder 40 coincides with the zero-ratio position, when the second signal S11 turns to L and stops the feedback control.

Correction of the position of the holder 40 when the zero vehicle speed is detected is made in similar manner.

In the four-wheel steering system in this embodiment, the rear wheel turning angle ratio is normally controlled in an open loop by the turning angle calculating section 61 and is changed with high response to the vehicle speed. Since the rear wheel turning angle ratio is normally controlled in an open loop, hunting does not occur and good running stability is ensured. Further, since errors in control of the rear wheel turning angle ratio are corrected at the preset vehicle speeds, reliability of the open loop control can be maintained.

This particular embodiment in which correction of the rear wheel turning angle ratio is made at the zero vehicle speed and the vehicle speed at which the rear wheel turning angle ratio is to be zero is especially advantageous in that the points to be detected by the rear wheel turning angle ratio detecting means may be small in number and a simple digital type sensor can be used as the rear wheel turning angle ratio detecting means 8a, thereby simplifying the control system and improving the control system's resistance to noise and vibration. The fact that the correction of the rear wheel turning angle ratio is made at the zero vehicle speed is advantageous in that driving can be started with an accurate rear wheel turning angle ratio control since the correction of the rear wheel turning angle ratio has been effected during parking and the correction of the rear wheel turning angle ratio does not adversely affect the running stability. Further, the fact that the correction of the rear wheel turning angle ratio is made at the vehicle speed at which the rear wheel turning angle ratio is to be zero is advantageous in that the possibility of the actual rear wheel turning angle ratio being in the same phase range when it should be in the reverse phase range and the reverse possibility can be avoided.

Further, the rear wheel turning angle ratio changing mechanism 22 is arranged to fix the rear wheel turning angle ratio at zero, if the control system of the turning angle calculating section is out of order. Said feedback control section may be used for this purpose.

Figure 8:
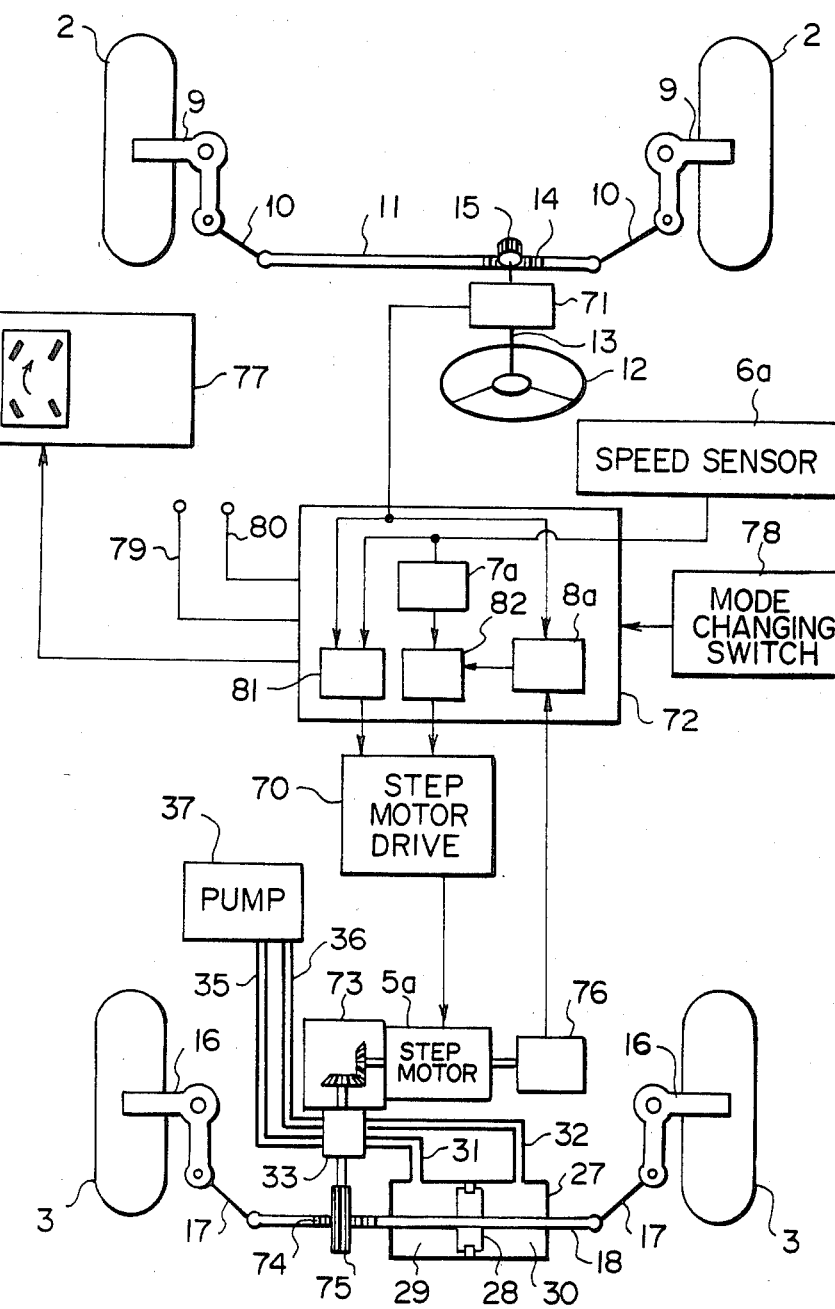
FIG. 8 is a schematic view showing a four-wheel steering system in accordance with another embodiment of the present invention.

FIG. 8 shows another embodiment of the present invention in which the front wheel turning mechanism and the rear wheel turning mechanism are electrically connected with each other.

In FIG. 8, the four-wheel steering system in this embodiment includes a steering wheel turning angle sensor 71 provided on the steering shaft 13 to detect the turning angle of the steering wheel 12, a controller 72 which receives a steering wheel turning angle signal from the steering wheel turning angle sensor 71 and a vehicle speed signal from the vehicle speed sensor 6a and outputs a control signal and a step motor 5a which turns the rear wheels 3 under the control of a driving signal from a step motor driving section 70.

The stepping motor 5a is connected to a pinion 75 by way of a transmission mechanism 73 comprising a pair of bevel gears, the pinion 75 being in mesh with a rack 74 provided on the rear relay rod 18. The hydraulic control valve 33 controls connection of the oil passage and the oil pressure according to the rotating direction and the rotating force of the pinion 75. The step motor 5a is provided with a rear wheel turning angle sensor 76 which delivers a rear wheel turning angle signal to the controller 72. To the controller 72 are connected a display device 77 for pictorially displaying the steering mode (the same phase or the reverse phase or the neutral mode in which the rear wheels are not turned in response to the operation of the steering wheels), a mode changing switch 78 for selecting the steering mode, a power line 79 for connecting the controller 72 to the battery by way of the ignition switch (not shown) and a conductive cable 80 for storing the steering wheel turning angle.

The controller 72 includes a turning angle calculating section 81 which calculates the angle by which the rear wheels 3 are to be turned from the turning angle of the front wheels obtained from the steering wheel turning angle signal and the rear wheel turning angle ratio derived from the vehicle speed signal and delivers a control signal to the step motor driving section 70, a preset vehicle speed detector 7a for detecting the zero vehicle speed and the vehicle speed at which the rear wheel turning angle ratio is to be zero from the vehicle speed signal, a rear wheel turning angle ratio detecting means 8a which detects the rear wheel turning angle ratio from the steering wheel turning angle signal and the rear wheel turning angle signal and a feedback control section 82 which receives detecting signals from the preset vehicle speed detector 7a and the rear wheel turning angle ratio detecting means 8a, and effects feedback control of the rear wheel turning angle ratio when one of the preset vehicle speeds is detected.

Thus in this embodiment, the turning angle calculating section 81 controls the rear wheel turning angle ratio according to the vehicle speed and the step motor 5a changes the rear wheel turning angle ratio and at the same time provides force for turning the rear wheels 3.

The mode changing switch 78 is for manually selecting the steering mode in the low vehicle speed range, for example. For example, though the steering mode is automatically changed to the reverse phase in the low vehicle speed range in accordance with the rear wheel turning angle ratio characteristics shown in FIG. 6, the steering mode can be manually changed to the same phase by operating the mode changing switch 78.

Though the rear wheel turning angle ratio is changed according to the vehicle speed in the embodiments described above, the rear wheel turning angle ratio may be changed according to a combination of the vehicle speed and another factor such as lateral acceleration of the vehicle body.

I claim:

1. A four-wheel steering system for a vehicle comprising a steering wheel, a front wheel turning mechanism for turning front wheels in response to the operation of the steering wheel, a rear wheel turning mechanism which turns rear wheels in response to the operation of the steering wheel, an electric actuator for changing the position of a movable member, the position of which determines a rear wheel turning angle ratio, said rear wheel turning angle ratio being a ratio of the turning angle of the rear wheels to the turning angle of the front wheels for a given turning angle of the steering wheel, and a vehicle speed sensor and a target rear wheel turning angle ratio setting means for setting a target rear wheel turning angle ratio according to a speed detected by said vehicle speed sensor, the electric actuator being controlled to obtain and target rear wheel turning angle ratio wherein the improvement comprises a preset vehicle speed detecting means for providing a detection signal when at least one preset vehicle speed is detected, a first control means for receiving a signal from said target rear wheel turning angle ratio setting means and outputting a driving signal to said electric actuator to thereby control said actuator when the vehicle speed is not at set preset vehicle speed, a rear wheel turning angle ratio detecting means for detecting the actual rear wheel turning angle ratio, and a second control means for receiving signals from the preset vehicle speed detecting means and the rear wheel turning angle ratio detecting means and, when the vehicle speed is at said preset vehicle speed providing a driving signal to said electric actuator to change the position of the movable member so that the actual rear wheel turning angle ratio coincides with the target rear wheel turning angle ratio at said preset vehicle speed.

2. A four-wheel steering system as defined in claim 1 in which said preset vehicle speed is zero.

3. A four-wheel steering system as defined in claim 1 in which said preset vehicle speed is a speed at which said target rear wheel turning angle ratio is zero.

4. A four-wheel steering system as defined in claim 1 in which said electric actuator is a step motor which can be rotated in both directions according to a control pulse.

5. A four-wheel steering system as defined in claim 4 in which said rear wheel turning angle ratio detecting means detects the actual rear wheel turning angle ratio through the angular position of the step motor.

6. A four-wheel steering system as defined in claim 4 in which said rear wheel turning mechanism comprises a connecting rod which is mechanically connected to the front wheel turning mechanism to be rotated by an angle corresponding to the turning angle of the front wheels, a control rod which is slidable in the axial direction thereof and is connected to the rear wheels by way of a link mechanism so that the rear wheels are turned in response to the axial movement of the control rod, and a rear wheel turning angle ratio changing mechanism which is connected between the connecting rod and the control rod to convert rotation of the connecting rod into axial displacement of the control rod, a movable member, the position of which determines the rear wheel turning angle ratio, being provided in the rear wheel turning angle ratio changing mechanism to change the direction and amount of the axial displacement of the control rod for a given direction and a given angle of rotation of the connecting rod.

7. A four-wheel steering system as defined in claim 4 in which said control means and the correction means forms a control circuit comprising a rear wheel turning angle calculating section for calculating an angle by which the rear wheels are to be turned to obtain the target rear wheel turning angle ratio according to the detected vehicle speed, a feedback control section for calculating the correction amount by which the movable member is to be moved in order to make the actual rear wheel turning angle ratio coincide with the target rear wheel turning angle ratio at said preset vehicle speed, and a changeover section which selectively delivers the output of the rear wheel turning angle calculating section or the feedback control section to the step motor.

8. A four-wheel steering system for a vehicle comprising a steering wheel, a front wheel turning mechanism for turning front wheels in response to the operation of the steering wheel, a rear wheel turning mechanism which turns rear wheels in response to the operation of the steering wheel, an electric actuator for changing the position of a movable member, the position of which determines a rear wheel turning angle ratio, said rear wheel turning angle ratio being a ratio of the turning angle of the rear wheels to the turning angle of the front wheels for a given turning angle of the steering wheel, and a vehicle speed sensor, and a target rear wheel turning angle ratio setting means for setting a target rear wheel turning angle ratio according to a speed detected by said vehicle speed sensor, the electric actuator being controlled to obtain said target rear wheel turning angle ratio, wherein the improvement comprises means for detecting a parking state of the vehicle and for providing a detection signal when the parking state is detected, a first control means for receiving a signal from said target rear wheel turning angle ratio setting means and outputting a driving signal to said electric actuator to thereby control said actuator when the vehicle is not in said parking state a rear wheel turning angle ratio detecting means for detecting the actual rear wheel turning angle ratio, and a second control means for receiving signals from the parking state detecting means and the rear wheel turning angle ratio detecting means and, when the vehicle is in said parking state, providing a driving signal to said electric actuator to c the position of the movable member so that the actual rear wheel turning angle ratio coincides with the target wheel turning angle ratio when the vehicle is in the parking state.

9. A four-wheel steering system for a vehicle comprising a steering wheel, a front wheel turning mechanism for turning front wheels in response to the operation of the steering wheel, a rear wheel turning mechanism which turns rear wheels in response to the operation of the steering wheel, an electric actuator for changing the position of a movable member, the position of which determines a rear wheel turning angle ratio, said rear wheel turning angle ratio being a ratio of the turning angle of the rear wheels to the turning angle of the front wheels for a given turning angle of the steering wheel, and a vehicle speed sensor, and a target rear wheel turning angle ratio setting means for setting a target rear wheel turning angle ratio according to a speed detected by said vehicle speed sensor, the electric actuator being controlled to obtain said target rear wheel turning angle ratio, wherein the improvement comprises condition detecting means for detecting a condition where correction of the rear wheel turning ratio does not affect the running stability of the vehicle and for providing a detection signal when said condition is detected, a first control means for receiving a signal from said target rear wheel turning angle ratio setting means and outputting a driving signal to said electric actuator to thereby control said actuator when said condition is not detected, a rear wheel turning angle ratio detecting means for detecting the actual rear wheel turning angle ratio, and a second control means for receiving signals from the condition detecting means and the rear wheel turning angle ratio detecting means and, when said condition is detected, providing a driving signal to said electric actuator to change the position of the movable member so that the actual rear wheel turning angle ratio coincides with the target wheel turning angle ratio when said condition is present.

* * * * *